(12) United States Patent
Yamamoto et al.

(10) Patent No.: US 11,786,969 B2
(45) Date of Patent: Oct. 17, 2023

(54) SLIDING MEMBER AND METHOD FOR PRODUCING SAME

(71) Applicant: DAIDO METAL COMPANY LTD., Nagoya (JP)

(72) Inventors: Ayako Yamamoto, Inuyama (JP); Yoshifumi Ito, Inuyama (JP); Norihito Watanabe, Inuyama (JP); Hirotaka Inoue, Inuyama (JP); Akihiro Matsuoka, Inuyama (JP)

(73) Assignee: DAIDO METAL COMPANY LTD., Nagoya (JP)

( * ) Notice: Subject to any disclaimer, the term of this patent is extended or adjusted under 35 U.S.C. 154(b) by 0 days.

(21) Appl. No.: 17/711,227

(22) Filed: Apr. 1, 2022

(65) Prior Publication Data
US 2022/0314318 A1 Oct. 6, 2022

(30) Foreign Application Priority Data
Apr. 2, 2021 (JP) .................. 2021-063790

(51) Int. Cl.
*B22F 7/04* (2006.01)
*F16C 33/12* (2006.01)
*B22F 3/11* (2006.01)
*B22F 3/26* (2006.01)
*B32B 15/08* (2006.01)
*B32B 3/02* (2006.01)
(Continued)

(52) U.S. Cl.
CPC .............. *B22F 7/04* (2013.01); *B22F 3/1146* (2013.01); *B22F 3/26* (2013.01); *B32B 3/02* (2013.01); *B32B 5/16* (2013.01); *B32B 15/08* (2013.01); *F16C 33/122* (2013.01); *B22F 2003/247* (2013.01); *B22F 2301/10* (2013.01); *B32B 2260/025* (2013.01); *B32B 2260/046* (2013.01); *B32B 2264/105* (2013.01); *B32B 2307/746* (2013.01); *Y10T 428/12396* (2015.01)

(58) Field of Classification Search
None
See application file for complete search history.

(56) References Cited

U.S. PATENT DOCUMENTS

2016/0256929 A1* 9/2016 Taylor .................. B32B 15/015

FOREIGN PATENT DOCUMENTS

| JP | 2006132540 A | 5/2006 |
| JP | 2008-133954 A | 6/2008 |
| JP | 2020193626 A | 12/2020 |

* cited by examiner

*Primary Examiner* — Xiaobei Wang
(74) *Attorney, Agent, or Firm* — Browdy and Neimark, PLLC (57) ABSTRACT

Provided is a method for producing a sliding member formed by impregnating a porous base member made of a bronze-based alloy with a resin material, the sliding member including a sliding surface where both the porous base member and the resin material are exposed, the method including: a step of preparing a back metal layer; a porous base member formation step of forming the porous base member by depositing particles of the bronze-based alloy on a surface of the back metal layer and sintering the particles; an impregnation step of impregnating the porous base member with the resin material; a deformation step of deforming an end edge of the back metal layer in a direction away from the sliding surface; and a cutting step of cutting the porous base member impregnated with the resin material to form the sliding surface.

13 Claims, 6 Drawing Sheets

(51) Int. Cl.
 *B32B 5/16* (2006.01)
 *B22F 3/24* (2006.01)

SLIDING MEMBER AND METHOD FOR PRODUCING SAME

CROSS REFERENCE TO RELATED APPLICATIONS

This application claims the benefit of priority to Japanese Patent Application Number 2021-063790 filed on Apr. 2, 2021. The entire contents of the above-identified application are hereby incorporated by reference.

TECHNICAL FIELD

The disclosure relates to improvement of a sliding member used in a compressor for a freezing machine, and a method for producing the sliding member.

BACKGROUND

A sliding member used in a compressor for a freezing machine includes a back metal layer and a sliding layer. The sliding layer includes a porous base member and a resin material. The porous base member is impregnated with the resin material. The porous base member has a structure in which particles of a bronze-based alloy are deposited and sintered. The resin material is a composite material of a tetrafluoroethylene-based synthetic resin and a lubricant, and is compatible with recent chlorine-free refrigerants for a freezing machine.

The porous base member made of a bronze-based alloy and the resin material are both exposed at a sliding surface of the sliding member. JP 2006-132540 A proposes setting the exposed area ratio of the porous base member to not less than 5% and not greater than 60%.

In addition, JP 2020-193626 A proposes a configuration in which an end edge of the sliding surface of the sliding member is made of a material having a higher seizure resistance than that of the porous base member made of a bronze-based alloy. When the end edge of the sliding surface of the sliding member is made of a material having high seizure resistance, problems such as seizure caused by partial contact can be prevented.

SUMMARY

In the technology disclosed in JP 2020-193626 A, to achieve a configuration in which the end edge of the sliding surface of the sliding member is made of a material that has a higher seizure resistance than that of the porous base member made of a bronze-based alloy, different materials are used for a first material constituting the central portion of the sliding surface and a second material constituting the end edge. As described in JP 2020-193626 A, to form the central portion of the sliding surface and the end edge of the sliding surface using different materials, the central portion of the sliding surface is first formed using the first material, and then the end edge of the sliding surface is formed using the second material.

Performing such two-color molding is labor-intensive.

Therefore, the present inventors investigated a method of improving the seizure resistance of the end edge of the sliding surface of the sliding member. The porous base member formed by sintering particles of a bronze-based alloy has different densities in the thickness direction, and the present inventors investigated a simple method that uses this difference in densities to improve the seizure resistance.

In other words, the present inventors found that the density of the porous base member is lowest at the surface and increases with depth.

Since the porous base member of the sliding member is filled with the resin material, the density of the porous base member decreases as the density of the resin material increases, and this improves the seizure resistance. The present inventors arrived at the disclosure focusing on this property of the porous base member.

Figure 1A:
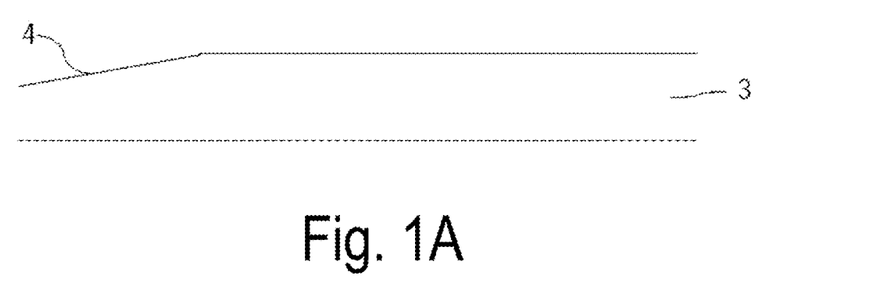
FIG. 1A is a schematic view illustrating a back metal layer prepared in a method for producing a sliding member of the disclosure.
Figure 2:
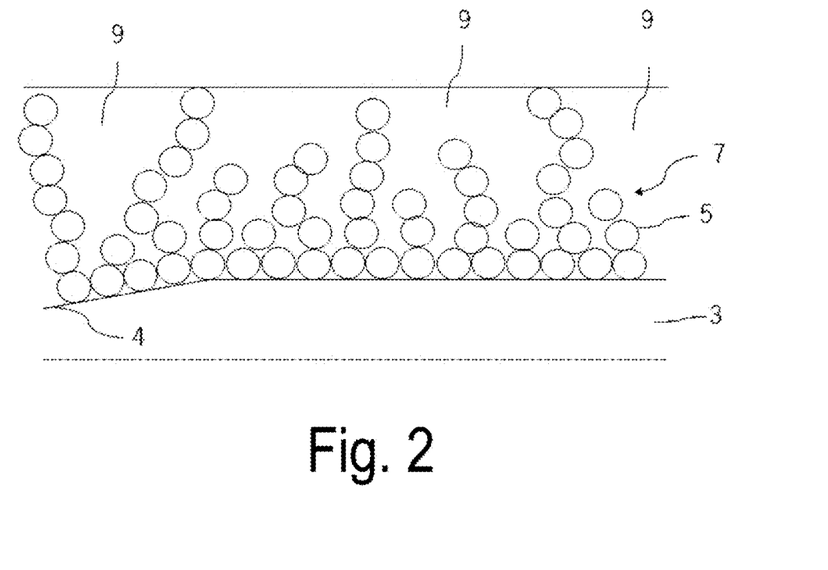
FIG. 2 is similarly a schematic view illustrating a state in which the porous base member is impregnated with a resin material.
Figure 3A:
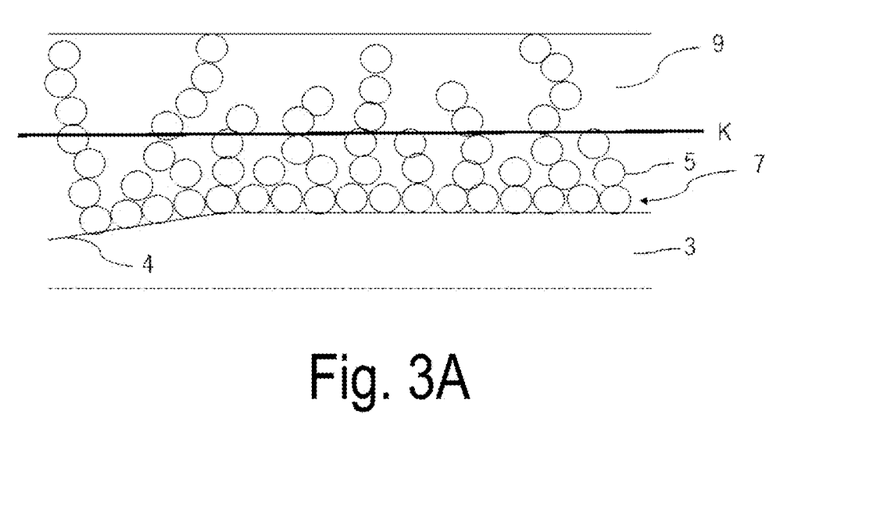
FIG. 3A illustrates a cut surface K of the porous base member impregnated with the resin material.
Figure 3B:
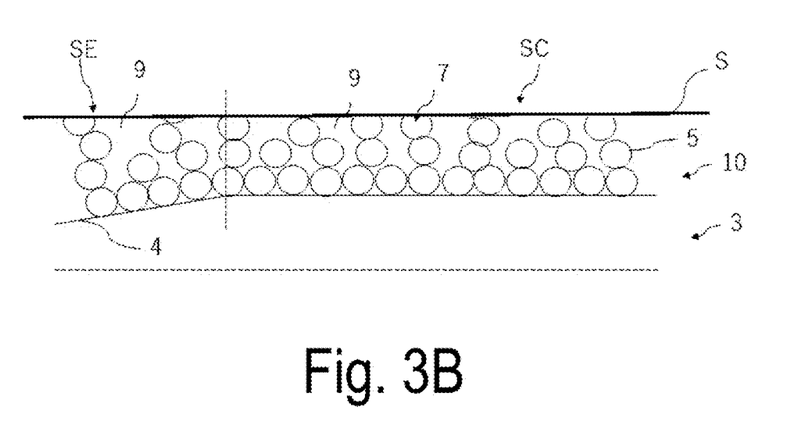
FIG. 3B illustrates the structure of the porous base member after cutting.

When the sliding member including the sliding surface where both the porous base member and the resin material are exposed is manufactured by impregnating the porous base member made of a bronze-based alloy with the resin material, first, a back metal layer 3 is prepared and then an end edge 4 of the back metal layer 3 is indented in advance (the end edge 4 is deformed in a direction away from a sliding surface S) (see FIGS. 1A and 3B). Particles 5 of a bronze-based alloy are uniformly deposited on the entire surface of the back metal layer 3 processed as described above such that the deposited particles 5 are thicker than a planned sliding layer 10 (see FIG. 3B). Then, the particles 5 are sintered to form a porous base member 7. (See FIG. 1B). Thereafter, the porous base member 7 is impregnated with the resin material 9 (FIG. 2).

Next, as illustrated in FIG. 3A, the porous base member 7 impregnated with the resin material 9 is cut at a surface K. The surface K is a surface that is parallel to a platen area, that is not indented, of the back metal layer 3.

The deformation of the back metal layer is preferably performed after the porous base member is impregnated with the resin material. However, the deformation of the back metal layer may be performed before the formation of the porous base member or between the formation of the porous base member and the impregnation with the resin material.

Further, the end edge 4 is an inclined surface in the example of FIGS. 1A and 2B, but the end edge 4 can be provided with a step formed between the end edge 4 and another portion (central portion), and the end edge 4 can be inclined from this step. The end edge 4 can also be flat (parallel to the central portion) from the step to the end.

The cut surface corresponds to the sliding surface S (see FIG. 3B).

At this sliding surface S, the thickness of the porous base member 7 differs between an end edge SE corresponding to the end edge 4 of the back metal layer 3 and a central portion SC, the former being thicker than the latter.

Since the density of the porous base member 7 decreases closer to the surface, the density of the porous base member 7 is lower at the end edge SE of the sliding surface S than at the central portion SC.

In other words, the exposed area ratio of the porous base member 7 at the end edge SE is smaller than that at the central portion SC of the sliding surface S.

As a result, the seizure resistance at the end edge SE is improved over that at the central portion SC without changing materials, that is, without performing two-color molding.

A first aspect of the disclosure can be defined as follows.

A method for producing a sliding member formed by impregnating a porous base member made of a bronze-based alloy with a resin material, the sliding member including a sliding surface where both the porous base member and the resin material are exposed, the method including:

a step of preparing a back metal layer;

a porous base member formation step of forming the porous base member by depositing particles of the bronze-based alloy on a surface of the back metal layer and sintering the particles;

an impregnation step of impregnating the porous base member with the resin material;

a deformation step of deforming an end edge of the back metal layer in a direction away from the sliding surface; and a cutting step of cutting the porous base member impregnated with the resin material to form the sliding surface.

The sliding member produced as described above is defined as follows based on its structure.

A sliding member formed by impregnating a porous base member made of a bronze-based alloy with a resin material, the sliding member including a sliding surface where both the porous base member and the resin material are exposed, in which the exposed area ratio of the porous base member at an end edge of the sliding surface is less than an exposed area ratio at a central portion of the sliding surface.

According to the sliding member defined in this way, the exposed area ratio of the porous base member is made smaller at the end edge of the sliding surface and slidability is improved. As a result, seizure or the like caused by partial contact can be prevented.

Note that the exposed area ratio of the porous base member at the sliding surface can be controlled by a production method other than the production method according to the first aspect described above. For example, the exposed area ratio of the porous base member at the end edge can be reduced by increasing the particle size of the bronze-based alloy particles constituting the end edge, relative to the central portion of the sliding surface.

According to investigation by the present inventors, the width of the end edge set to reduce the exposed area ratio of the porous base member at the sliding surface is preferably 5 mm or less. By setting the width to 5 mm or less, seizure or the like caused by partial contact can be effectively prevented. When the width exceeds 5 mm, the durability of the entire sliding surface may decrease.

From another standpoint, the width of the end edge can be from 10 to 90% of the total sliding surface.

Although the boundary between the end edge and the central portion is not apparent enough to draw a line, the end edge can be defined as, for example, an area in which the exposed area ratio is less than or equal to 5% as compared to the central portion.

DESCRIPTION OF EMBODIMENTS

A back metal layer 3 is a member made of steel. The diameter, length, and thickness of the back metal layer 3 are selected as appropriate depending on the compressor for a freezing machine in which the sliding member is used.

In this example, so-called crowning is performed on both end edges 4 of the back metal layer 3 to recess the end edges 4 and form inclined surfaces in directions away from the sliding surface. The length of each end edge 4 can be freely set, but is preferably 5 mm or less.

The method for shaping the end edge 4 is described later.

A plate-like steel sheet, for example, is prepared as the back metal layer, and bronze-based alloy particles are deposited on the surface. The shape of the steel sheet used for the back metal layer is not particularly limited provided that the bronze-based alloy particles can be deposited.

The particle size of the bronze-based alloy particles consisting of a copper-tin alloy can be selected as appropriate according to the characteristics required of the sliding member, and the average particle size can be from 50 to 200 μm. The particles used may be spherical particles or may have a different shape.

The method of depositing can be selected as appropriate according to the material of the back metal layer 3 and the desired thickness of the back metal layer 3. For example, the bronze-based alloy particles are sprayed on the surface of the back metal layer 3, and then the thickness is made uniform with a spatula or the like.

After being deposited, the bronze-based alloy particles are sintered at conditions that maintain the shape of the particles. As a result, the particles cohere together, and the porous base member 7 is formed. The porous base member 7 is also cohered to the back metal layer 3.

Figure 1B:
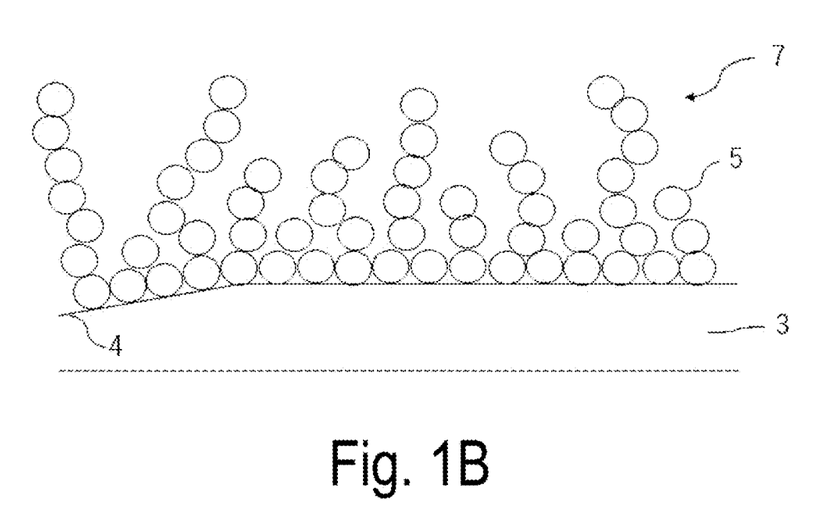
FIG. 1B is a schematic view illustrating a porous base member formed on a surface of the back metal layer.

As illustrated schematically in FIG. 1B, the porous base member 7 formed as described above gradually decreases in density from the back metal layer 3 side toward the surface side.

Figure 4:
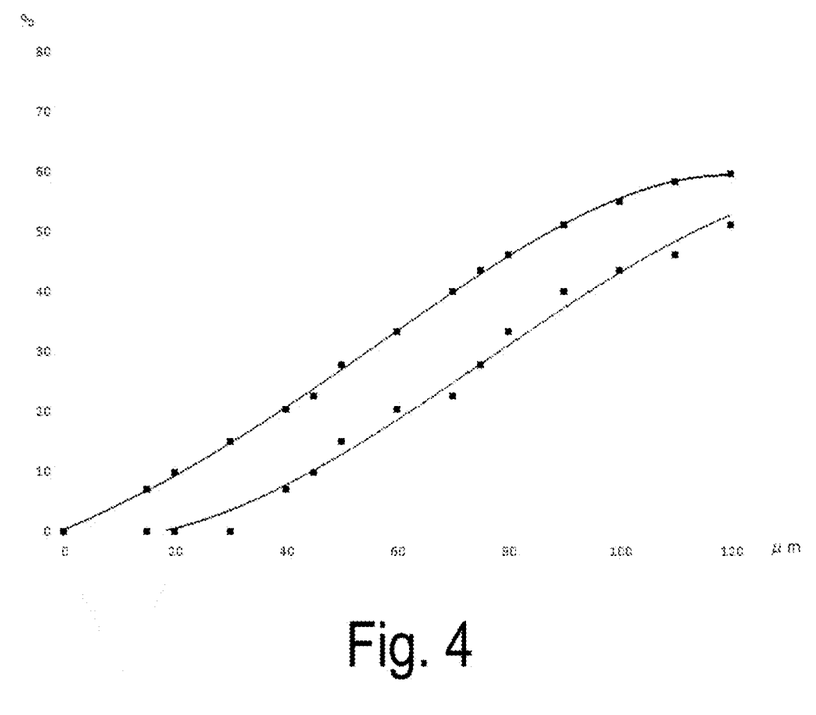
FIG. 4 is a graph showing the depth and the exposed area ratio of the porous base member.

FIG. 4 shows the relationship between the thickness of the porous base member 7 and the exposed area ratio. In the graph, the horizontal axis represents the thickness (μm) of the porous base member 7 impregnated with the resin material 9 cut from the surface, and the vertical axis represents the exposed area ratio (%) of the porous base member 7 when cut. The upper line in FIG. 4 represents the value of the central portion of the back metal layer 3, and the lower line represents the value of the end edge 4. The exposed area ratio (%) can be found by capturing an image of the cross-section surface to depth direction from the sliding surface and binarizing the difference in lightness between the portion of the porous base member 7 and another portion.

Note that, to obtain the results of FIG. 4, bronze-based alloy particles were sprayed to a thickness of 300 μm on the surface of the steel back metal layer 3, and then the thickness was made uniform with a spatula. Thereafter, the particles were sintered at 900° C. for 20 minutes in a reducing atmosphere. Thereafter, cross-section surfaces obtained by cutting the porous base member 7 impregnated with the resin material 9 to different depths were subject to image processing, and the exposed area ratio at each depth was calculated.

The resin material 9 used to fill the voids in the porous base member 7 illustrated in FIG. 1B can be selected as appropriate depending on the application of the sliding member.

A synthetic resin having excellent durability, such as a fluororesin, is preferably used as the resin serving as the base material of the resin material 9. The resin material 9 preferably contains a lubricant or wear resistant material. An example of the lubricant is a solid lubricant such as molybdenum disulfide. Examples of the wear resistant material include an inorganic material such as barium sulfate and a metal material.

The porous base member 7 is impregnated with the resin material 9 made of a fluororesin prepared as described above.

The resin material 9 with which the porous base member 7 is impregnated is fired using a method such as heating.

As a result, a structure (hybrid body) in which holes (voids) of the porous base member 7 are filled with the resin material 9 is obtained (see FIG. 2). As illustrated in FIG. 4, when the porous base member 7 is cut from the surface to a depth of 120 µm, the exposed area ratio of the porous base member 7 at the surface is 60%.

As described above, the hybrid body of the porous base member 7 and the resin material 9 is layered on the surface of the plate-like back metal layer 3. This is then cut to a product width to form a first intermediate. The first intermediate is shaped into a cylindrical shape such that the hybrid body is located on the inner peripheral surface side. The end edge of the cylindrical first intermediate is shaped so as to be deformed toward the outer peripheral surface side, that is, away from the sliding surface to form a second intermediate. Note that the second intermediate can also be obtained by pre-deforming the end edge of the first intermediate.

The second intermediate is pressed into a housing of a compressor such as that in a freezing machine. An inner peripheral surface of the second intermediate is then cut at the surface K, as illustrated in FIG. 3A. The cut surface is the sliding surface S. When the surface K is set such that the cut depth at the central portion of the back metal layer 3 is 60 µm, based on the example in FIG. 4, the exposed area ratio at the central portion SC of the sliding surface S is 33%, whereas the exposed area ratio is slightly less than 20% at the end edge SE of the sliding surface S.

Note that the exposed area ratios of the sliding surface can be selected as appropriate based on the results of FIG. 4.

EXAMPLES

A steel cylinder having an outer diameter dimension of 40 mm, a thickness of 2 mm, and a length of 35 mm was used as the back metal layer 3, and both end edges of the cylinder on the inner peripheral surface were subjected to crowning at a width of 5 mm in the axial direction. The cut depth at the end-most portion was 20 µm.

Bronze-based alloy particles were prepared and deposited onto the entire back metal layer 3.

The thickness of the deposited particles was 300 µm.

Then, the particles were sintered in a reducing atmosphere under the condition of 900° C.×20 minutes to cohere the surfaces of the particles together.

The product "CD097" PTFE, available from AGC Inc., was used as the resin matrix of the resin material 9, and molybdenum disulfide was used as the lubricant. The compounded ratio of both was 85:15.

The lubricant was dispersed in the resin matrix, and the porous base member was impregnated with the resulting resin material. Thereafter, a heating process was performed to fire the resin material.

After sintering, the hybrid body of the porous base member 7 and the resin material 9 was cut so that the cut depth of the porous base member 7 was 60 µm at the central portion of the back metal layer 3. Thus, the sliding surface S was formed. The exposed area ratio of the porous base member 7 at the central portion SC of the sliding surface S was 33%. Meanwhile, the exposed area ratio at the end edge SE was 18%. In this example, the exposed area ratio at the center of the end edge SE is employed, but the average value of exposed area ratios across the entire end edge SE may be employed.

The cut surface K of the porous base member 7 is assumed to be present in a virtual cylindrical surface centered about the axial center of the sliding member, and the surface after cutting is the sliding surface S. Note that crowning can also be performed on the end edge SE of the sliding surface S. The inclined surface formed by such a crowning process preferably has a smaller inclination angle with respect to the sliding surface than that of the inclined surface of the end edge 4 formed in the back metal layer 3. This is to ensure that the density of the porous base member 7 at the end edge SE is reliably lower than that at the central portion SC.

This disclosure is not limited in any way to the description of the embodiments of the disclosure described above. Various variations that can be easily conceived by a person skilled in the art and that do not fall outside of the scope of the claims are also included in the disclosure. A device that employs a bearing mechanism that uses the sliding member of the disclosure exhibits excellent sliding characteristics.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

The invention claimed is:

1. A sliding member formed by impregnating a porous base member made of a bronze-based alloy with a resin material, the sliding member comprising:
    a sliding surface where both the porous base member and the resin material are exposed,
    wherein an exposed area ratio of the porous base member at an end edge of the sliding surface is less than an exposed area ratio of the porous base member at a central portion of the sliding surface,
    wherein the porous base member constituting the end edge of the sliding surface is thicker than other portions of the porous base member.

2. The sliding member according to claim 1, wherein a width of the end edge is 5 mm or less.

3. The sliding member according to claim 1, wherein the porous base member is formed on a surface of a back metal layer, and the back metal layer is deformed in a direction away from the sliding surface at a portion of the back metal layer supporting the end edge.

4. A process for producing the sliding member according to claim 1 formed by impregnating a porous base member made of a bronze-based alloy with a resin material, the sliding member including a sliding surface where both the porous base member and the resin material are exposed, the method comprising:
    a step of preparing a back metal layer;
    a porous base member formation step of forming the porous base member by depositing particles of the bronze-based alloy on a surface of the back metal layer and sintering the particles;
    an impregnation step of impregnating the porous base member with the resin material;
    a deformation step of deforming an end edge of the back metal layer in a direction away from the sliding surface; and a cutting step of cutting the porous base member impregnated with the resin material to form the sliding surface.

5. The process for producing a sliding member according to claim 4, wherein the deformation step is performed after the impregnation step.

6. The process for producing a sliding member according to claim 4, wherein the deformation step is performed before the impregnation step.

7. The process for producing a sliding member according to claim 4, wherein, after the impregnation step, the back metal layer including the porous base member impregnated with the resin material is cut to a product width to form a first intermediate,
   in the deformation step, the first intermediate is molded to a predetermined cylindrical shape, and an end edge of the first intermediate is deformed in a direction away from the sliding surface to form a second intermediate, and
   in the cutting step, the porous base member impregnated with the resin material in the second intermediate is cut to form the sliding surface.

8. The process for producing a sliding member according to claim 4, wherein, after the impregnation step, the back metal layer including the porous base member impregnated with the resin material is cut to a product width to form a first intermediate,
   in the deformation step, an end edge of the first intermediate is deformed in a direction away from the sliding surface,
   the first intermediate thus deformed is molded into a predetermined cylindrical shape to form a second intermediate, and
   in the cutting step, the porous base member impregnated with the resin material in the second intermediate is cut to form the sliding surface.

9. A process for producing a sliding device including the sliding member according to claim 1 formed by impregnating a porous base member made of a bronze-based alloy with a resin material, the sliding member including a sliding surface where both the porous base member and the resin material are exposed, and a housing, the method comprising:
   a step of preparing a back metal layer;
   a porous base member formation step of forming the porous base member by depositing particles of the bronze-based alloy on a surface of the back metal layer and sintering the particles;
   an impregnation step of impregnating the porous base member with the resin material;
   a deformation step of deforming an end edge of the back metal layer in a direction away from the sliding surface;
   a pressing step of pressing the back metal layer into the housing; and
   a cutting step of cutting the porous base member impregnated with the resin material to form the sliding surface.

10. The process for producing a sliding device according to claim 9, wherein the deformation step is performed after the impregnation step.

11. The process for producing a sliding device according to claim 9, wherein the deformation step is performed before the impregnation step.

12. The process for producing a sliding device according to claim 9, wherein, after the impregnation step, the back metal layer including the porous base member impregnated with the resin material is cut to a product width to form a first intermediate,
    in the deformation step, the first intermediate is molded to a predetermined cylindrical shape, and an end edge of the first intermediate is deformed in a direction away from the sliding surface to form a second intermediate, and
    in the pressing step, the back metal layer of the second intermediate is pressed into the housing.

13. The process for producing a sliding device according to claim 9, wherein, after the impregnation step, the back metal layer including the porous base member impregnated with the resin material is cut to a product width to form a first intermediate,
    in the deformation step, an end edge of the first intermediate is deformed in a direction away from the sliding surface,
    the first intermediate thus deformed is formed into a predetermined cylindrical shape to form a second intermediate,
    in the cutting step, the porous base member impregnated with the resin material in the second intermediate is cut to form the sliding surface, and
    in the pressing step, the back metal layer of the second intermediate is pressed into the housing.

\* \* \* \* \*